United States Patent [19]

Sims et al.

[11] 3,958,033

[45] May 18, 1976

[54] SHELF STABLE EMULSIONS

[75] Inventors: Rex J. Sims, Pleasantville; Howard D. Stahl, Hartsdale, both of N.Y.

[73] Assignee: General Foods Corporation, White Plains, N.Y.

[22] Filed: Sept. 9, 1974

[21] Appl. No.: 504,213

Related U.S. Application Data

[63] Continuation of Ser. No. 434,531, Jan. 18, 1974, abandoned.

[52] U.S. Cl. ............................... 426/602; 426/608; 426/611; 426/612; 426/654; 426/658
[51] Int. Cl.² ........................................... A23D 5/00
[58] Field of Search ........... 426/162, 163, 185, 189, 426/194, 199, 201, 356, 359, 362, 363, 213, 227, 601, 602, 607, 608, 611, 612, 654, 658

[56] References Cited
UNITED STATES PATENTS

| | | | |
|---|---|---|---|
| 2,786,765 | 3/1957 | Prince | 426/363 X |
| 3,514,298 | 5/1970 | Noznick et al. | 426/363 |
| 3,533,802 | 10/1970 | Cooper et al. | 426/363 X |
| 3,560,220 | 2/1971 | Bangert | 426/162 X |
| 3,695,889 | 10/1972 | Ingerson | 426/201 X |
| 3,751,265 | 8/1973 | Seiden | 426/611 |
| 3,752,770 | 8/1973 | Buddemeyer | 426/227 X |

*Primary Examiner*—S. Leon Bashore
*Assistant Examiner*—Arthur L. Corbin
*Attorney, Agent, or Firm*—Thaddius J. Carvis; Bruno P. Struzzi; Daniel J. Donovan

[57] ABSTRACT

A shelf-stable, protein free emulsion having a pH within the range of 6-8 consisting of 0.1-1 part neutral type fat, 1 part water, 2 parts sugar and about 0.25% to about 7% by weight of an emulsufier selected from sodium stearyl fumarate and sodium succinoylated monoglycerides. An adjunct emulsifier, such as propylene glycol monostearate as well as food flavoring and coloring may also be present.

11 Claims, No Drawings

SHELF STABLE EMULSIONS

This is a continuation of application Ser. No. 434,531, filed Jan. 18, 1974, now abandoned.

BACKGROUND OF THE INVENTION

1. Field of the Invention

This invention relates to improved liquid emulsion concentrates and, in particular, is directed to protein-free edible emulsified concentrates which can be stored at room temperature without phase separation and which are not susceptible to spoilage by microorganisms, molds, or yeast.

DESCRIPTION OF THE PRIOR ART

The food industry has long sought a stable oil-in-water emulsion which has broad application as the appropriate functional component in a wide area of food compositions — an emulsion which is not only pourable and/or spoonable, will whip readily with cold milk, and will provide good lightening power in hot coffee with no precipitation, but also one which will impart excellent flavor and textural attributes to the products in which it is incorporated.

The preparation of a stable protein-free emulsion is, of itself, difficult and heretofore the prior art has succeeded to a limited degree, in formulating emulsions, only by tailoring such emulsions for specific uses in particular food formulations but — for the most part — exacting penalties in the form of short-lived stability, dramatic increases in viscosity upon storage, poor flavor and/or microbial attack.

Noznick, et al (U.S. Pat. No. 3,514,298) have prepared stable spray dried aqueous emulsions of a carbohydrate and fat employing polyglycerol esters of fatty acids as the emulsifying agents having both hydrophilic and lyophilic characteristics. These emulsions, prior to spray drying, have a milky appearance and will show spoilage after relatively short periods of storage.

Prince (U.S. Pat. No. 2,786,765) discloses an edible stable emulsion comprised of sodium stearate, Span 60 (non-ionic emulsifier corresponding to a sorbitan monostearate), sugar and softened water. Although Prince states that the emulsion may be kept at temperatures between 50° and 75°F. in a fluid condition and may be dispersed in water for many months after manufacture, upon preparation of the emulsion according to the specific procedures described in the reference, it becomes, after only 10 days storage at room temperature, an opaque paste similar in consistency to a shortening with a viscosity of 60,000 centipoises.

Cooper, et al (U.S. Pat. No. 3,533,802) disclose oil-in-water emulsions having some degree of stability for use in the preparation of food products containing sugar and shortenings. The "water soluble" emulsifiers used as described therein are in the free acid form and are, as such, adequate for the intended purpose of providing a stable, pumpable, emulsified form of shortening in sugar solution for use in commercial bakeries wherein the material would be processed within a relatively short period of time after preparation and would, therefore, not require prolonged stability. In those instances where emulsion stabilities of up to 4 months have been attained, it is noted that Cooper, et al resort to the use of the soap, potassium oleate, in the emulsion formulation. As is well-known, potassium oleate, although an excellent emulsifier, imparts an objectionable flavor and tends to render the emulsions prepared therewith, turbid and highly viscous. Soaps, such as potassium oleate, as a general rule, are not usually tolerated in foodstuffs.

The emulsion concentrates of the present invention manifest a significant improvement over the emulsion concentrates of Copper, et al in that they are appreciably more stable, have good clarity and are void of any objectionable soapy flavor. The improved emulsion concentrates of the present invention result from the discovery that certain chemically modified fatty esters, when converted to their sodium salts, can be employed as emulsifiers for the preparation of a unique class of emulsions having prolonged storage stability at room temperature and are characterized by their high sugar to water ratios and lack of any protein; emulsions which exhibit excellent clarity in a pourable liquid state and, when utilized in a multiplicity of food formulations, in addition to providing the intended functionality, impart excellent flavor and textural qualities to the finished food products.

Accordingly, the multi-functional oil-in-water emulsion concentrates of the instant invention have fulfilled the long outstanding requirement of the food industry for economical emulsion systems -- those that can be easily prepared without the need for expensive homogenization and are designed for varied application in a range of food compositions.

SUMMARY OF THE INVENTION

In accordance with one of the important aspects of the present invention, provision is made for oil-in-water emulsion systems which are room temperature stable for prolonged periods extending to well over one year, during which time the emulsion systems exhibit no separation of the phases and are not subject to microbial spoilage.

It is another object of the invention to provide an emulsion system which is a pourable liquid at room temperature and which does not increase significantly in viscosity during storage under ambient room temperatures or refrigeration (40°F.) temperature conditions.

It is still another object of the invention to provide a protein-free emulsion system which contains a high sugar to water ratio, a concentration of about 65% sugar in the water phase — equivalent to an essentially saturated water phase solution of sugar.

It is yet another object of the invention to provide an emulsion system which can be readily prepared by simple machine or manual mixing of the ingredients and does not require pressure homogenization in order to prevent separation of the oil and water phases during storage.

It is still a further object of the invention to provide a liquid emulsion system which has excellent lightening power in a coffee beverage without any precipitation and will impart a pleasant mouth-feel and no off-flavor.

In the accomplishment of the foregoing, it has been discovered that certain emulsifiers after suitable chemical modification for conversion to the ionic, highly hydrophilic form, will render the desired functionality and accord the liquid emulsion system, of which they are the salient ingredients, with stability over prolonged storage periods at room temperature.

It has been found that by neutralizing the carboxyl groups of specific carboxylic acid emulsifiers with sodium compounds to form the sodium salts of the carboxylic acids, the emulsifiers are rendered oil insoluble and made water soluble. While not intended to be bound by any particular theory, it is believed that the ionic sodium salts of the modified carboxylic acid emulsifiers provide the oil droplets in the formed emulsion with strong negative charges which results in mutual repulsion of these droplets, thereby preventing coacervation of the oil droplets and thus mitigating phase separation to the point where prolonged storage for periods extending well over one year has been attained without the emulsions "breaking" or thickening.

The success of the invention reflected in the resulting significantly improved emulsion concentrates as compared with those heretofore known, and particularly those disclosed by Cooper, et al (U.S. Pat. No. 3.533,802), rests upon the discovery that the sodium salts of selected carboxylic acid or phosphated monoglycerides are superior to the corresponding free-acid and/or the sodium salts of long chain fatty acids as emulsifying agents for imparting prolonged stability to high solids containing oil-in-water edible emulsion concentrates. The corresponding potassium salts of the short chain carboxylic acids are also effective as emulsifiers but to an extent less than the sodium salts. For purposes of the invention, therefore, the sodium salts are preferred.

The ionic emulsifying agents employed in the inventive emulsion concentrates are sodium stearyl fumarate, sodium stearoyl-2-lactylate and sodium succinoylated monoglycerides, sodium phosphated monoglycerides sodium malated propylene glycol monostearate, sodium citrated monoglycerides and the sodium salts of diacetyl tartaric acid esters of mono and di-glycerides. These agents are employed to provide protein-free, high sugar to water ratio emulsion concentrates which can be stored at room temperatures without phase separation and are resistant to microbial and mold growth. The emulsion concentrates of the invention have the diversified functionality of being readily whippable with cold milk to give toppings of excellent flavor and texture, and/or can be used as hot coffee beverage lighteners with no off-flavoring and no precipitation.

These and other objects, advantages, and features of the present invention will hereinafter appear and, for purposes of illustration but not limitations, exemplary preferred embodiments of the present invention are hereinafter described in detail.

DESCRIPTION OF THE PREFERRED EMBODIMENTS

The shelf stable liquid emulsions of this invention employ a high concentration of soluble solids in the aqueous phase to inhibit the growth of microorganisms. In most instances, sugar (sucrose) is the preferred soluble solid. However, in formulating the liquid emulsions for certain specific purposes, it has been found that a combination of sucrose and dextrose are preferable. For example, for those emulsion systems having a high water soluble solids content intended for prolonged storage at reduced (refrigerated $-40°F.$) temperature, it has been found that a mixture of sucrose and dextrose resists crystallization over the sucrose. Regardless of whether sucrose, or a combination of sucrose and dextrose are used, it is essential that the concentration be sufficient to effect microbial stability. Saturted sucrose solutions having a ratio by weight of about two parts of sucrose to one part of water bring about microbial stability by lowering the water activity, $A_w$ (ratio of the equilibrium partial vapor pressure of the solution of the partial vapor pressure of pure water at the same temperature), to a value of about 0.8, which is sufficient to inhibit the propagation of most common microorganisms. Similar results can be attained by substituting dextrose for a portion of the sucrose. The total sugar content of the emulsion concentrates should, therefore, be within the range from about 62.6% to about 66.7% by weight of the aqueous solution of the emulsion system to give the best resistance to spoilage.

Additionally, it has been found that by employing sucrose as the soluble solids at about a 2:1 weight ratio in water and emulsifying this solution with fat in an amount about equal in weight to the water will produce a substantially transparent emulsion brought about by a matching of the refractive indices of the fat and aqueous phases.

At sucrose to water ratios of less than 2:1, the emulsions, although stable to separation over prolonged periods of storage are typical "milky" fluids in appearance. Also, when the fat phase content is increased to about 150% of the weight of the water, the emulsion system reverts to an opaque paste. The weight relationship of soluble solids, water and fat phase, is therefore, critical from the standpoint of microbial stability, transparency, phase separation, and fluidity of the emulsion system. It has been found that a combination of these essential constituents closely approximating two parts by weight of soluble solids (sucrose), one part by weight of water and one part by weight of fat is preferred, and the emulsion systems, prepared in accordance with the method of the invention having substantially this weight relationship of these essential ingredients manifest their hereinabove mentioned desirable physical properties.

The fat ingredient of the emulsion systems of the invention can be any of the natural or processed fats commonly used in foodstuffs. In composition, they are comprised of mono, di, or triglycerides or a mixture thereof and may be partially or substantially completely hydrogenated. Preferably, the fats, either liquid or plastic at room temperature, have a high triglyceride content and are those fats derived from vegetable sources such as coconut; safflower, cottonseed, soybean, and palm kernel and from animal sources. It is essential, however, from the standpoint of emulsion phase stability, that the fats do not react chemically with the ionic-type emulsifiers (to be described hereinafter) and, therefore, should be of the neutral type, substantially free of both fatty and mineral acidity. The emulsion systems of the invention have adequate storage stability when they are formulated to have a pH ranging from about 6 to about 8 and for the best stability, the pH is preferably 7.

Within the recent past, many processed fats derived from the above sources have been made commercially available and are suitable for forming the fat-phase of the emulsion systems of the invention as will be described in more detail in the illustrative examples which form part of this specification.

The selection of a particular fat or combination of fats in a preferred embodiment of the invention, is dictated by the use for which the emulsion system is intended. Those emulsion systems designed, primarily for application as whipping agents, are formulated with a combination of a high dilatation, substantially completely hydrogenated coconut oil and cottonseed flakes. The emulsion, prepared with this fat combination, when blended and whipped with milk, provides superior aeration characteristics. Those emulsion systems containing the saturated oils (and/or unsaturated oils) will also perform as excellent coffee lighteners. Other embodiments of the invention are possible and practical; for example, employing a fat level of about 0.1 to about 0.2 parts of fat to one part of water and two parts of sucrose yields an emulsion system which can be formulated to provide a buttered syrup or a maple flavored spread. The point of the matter being that the type of fat and level at which it is formulated in the emulsion system cover a broad spectrum and are dictated primarily by the use for which the so formed emulsion system is intended.

The emulsifiers of the invention are of the highly ionic and highly hydrophilic form. The emulsifiers are the sodium salts of specific carboxylic acids and those determined representative for purposes of the invention are sodium stearyl fumarate, sodium stearoyl-2-lactylate, the sodium succinoylated monoglycerides, the sodium phosphated monoglycerides the sodium malated propylene glycol monostearates, the sodium citrated monoglycerides, and the sodium salts of diacetyl tartaric acid esters of mono- and di-glycerides. Sodium stearyl fumarate is the preferred emulsifier for the preparation of the liquid, shelf stable emulsions of the invention, and the sodium salt of a succinoylated monoglyceride is an almost equally preferable alternate.

The level of emulsifiers employed in the shelf stable emulsions ranges from about 0.25% to 7% by weight of the total emulsion system and preferably about 5%. Sodium stearyl fumarate, the preferred emulsifier has a rather limited solubility in water and it is necessary to disperse it at a temperature in excess of 80°C. Although the other emulsifiers are more soluble than sodium stearyl fumarate and can be employed at levels as high as 7% by weight of the emulsion system without separation, sodium stearyl fumarate, employed at its preferred level of about 1% by weight of the emulsion system has been found to impart superior storage stability to the system for prolonged periods of time at room temperatures and at household refrigerator temperatures.

The emulsions stabilized with sodium stearyl fumarate do not aerate quite as well as those stabilized with sodium stearoyl-2-lactylate and do not thicken to the same extent in the presence of protein. This deficiency of sodium stearyl fumarate has been overcome by the addition of propylene glycol monostearate to augment the emulsifier activity of the sodium stearyl fumarate to effect better whippability of the emulsion system when admixed with milk. Importantly, the addition of propylene glycol monostearate does not detract from the storage stability of those emulsion systems in which it is added. It is preferable to incorporate the propylene glycol monostearate into the emulsion system at a level of from about 3 parts to about 5 parts per each part by weight of the ionic emulsifier.

In order to have the emulsified concentrates of the invention exhibit the requisite storage stability, it is essential that the ingredients to be employed produce a substantially neutral emulsion having a pH ranging from about 6 to about 8 and preferably an emulsion having a pH of 7. The emulsion concentrates of the invention with respect to storage stability may be generally classified into two groups — those which exhibit outstanding superior stability, i.e., no phase separation during storage at room temperature for periods extending to one year and beyond and a second group wherein stability is effected for periods of one to four months at room temperatures and up to and beyond one year at refrigerated (40°F.) temperatures. Emulsion concentrates employing either sodium stearyl fumarate or the sodium salt of a succinoylated monoglyceride (either emulsified with or without propylene glycol monostearate as an adjunct emulsifier) are classified into the first group and those emulsion concentrates in which the other cited emulsifiers —sodium stearoyl-2-lactylate, sodium phosphated monoglycerides, sodium citrated monoglycerides, and the sodium salts of diacetyl tartaric acid esters of mono-acid di-glycerides — are to be classified into the second group.

The preparation of the liquid emulsion systems of the invention is brought about by a simple mixing procedure. In contrast to the requirements for preparing conventional emulsion systems, no pressure homogenization is required to issue phase stability of the emulsion systems of the instant invention. Briefly, the liquid emulsion systems are prepared by preblending the sugar with the emulsifier and then dissolving the preblend in the aqueous phase with stirring and heating. With the exception of sodium stearyl fumarate, all of the other cited emulsifiers can be dispersed in water at 60°C. Sodium stearyl fumarate is so sparingly soluble that temperatures of 80°–90°C. are required and it cannot be used successfully above 1% basis total emulsion weight. The melted fat is then added to the aqueous phase and the two are blended at high speed in a Waring Blendor or an Eppenbach Mixer.

Suitable food additives, such as flavoring and/or coloring ingredients can be added in effective amounts to the emulsion concentrates without impairing stability. The addition of a small amount of synthetic milk flavor has been determined to be particularly beneficial when the emulsion concentrate is intended for use as a coffee lightener. Also, potassium sorbate or other acceptable preservatives may be added in effective amounts to control microbial growth in those emulsion concentrates wherein the sugar level is insufficient to assure microbial stability.

The following examples illustrate the various facets of the invention. It should be understood, however, that these examples are merely meant to be illustrative and the invention is not to be limited thereto.

EXAMPLE I

A stable, clear fluid emulsion concentrate was formulated as follows:

| INGREDIENT | WEIGHT PERCENT |
|---|---|
| Sucrose | 46.6 |
| Fat[1] | 25.0 |
| Water | 23.4 |
| Sodium stearoyl-2-lactylate[2] | 5.0 |

[1]WECOTOP A — a blend of hydrogenated (Iodine value <4) coconut oils; Drew Food Division, Drew Chemical Corp., Parsippany, New Jersey.
[2]EMPLEX-1160-Patco Products, Kansas City, Missouri The emulsion concentrate was prepared by first blending 233g of sugar (sucrose) with 25g of finely ground EMPLEX (sodium stearoyl-2-lactylate) in a V-Blender for 10 minutes. This mixture was then added slowly to 117 ml of tap water. The water was stirred gently and held at 120°F. After about 10 minutes of stirring, the EMPLEX had become evenly dispersed.

This dispersion was then transferred to a Waring Blendor and 125g of WECOTOP A at 120°F. was added. Blending at high speed was continued for 10 minutes at which point the emulsion temperature had reached 160°F. Upon cooling to room temperature, it gradually lost air to give a translucent pourable emulsion of low viscosity. Upon dilution with distilled water, the dilute emulsion had a pH of 6.7.

The water activity, $A_w$ (ratio of the equilibrium partial vapor pressure of the emulsion to the partial vapor pressure of pure water at the same temperatures) was measured to be 0.80 and the emulsion was phase stable and microbiologically stable at room temperature for 3 months after which time the emulsifier had hydrolyzed to the degree whereat it lost its functionality and the emulsion phases separated. When stored at refrigerator temperature (40°F.), the emulsion was both phase and microbiologically stable for over one year. The emulsion did not exhibit a significant change in viscosity when refrigerated at 40°F.

EXAMPLE II

The liquid emulsion concentrate of Example I was used after 24 hours storage at room temperatures to prepare a dessert topping. Approximately ⅓ std cup (80g) of emulsion concentrate at room temperature was added to ½ cup (120 ml) of cold milk (40°F.) and the mixture whipped for 3 minutes with a standard, kitchen type machine beater. The dessert topping had a Brookfield Viscosity of 40 units and stood up in peaks. The topping had good flavor, texture and mouthfeel. The percent overrun of the topping was measured to be 432.

(1) Brookfield Synchroelectric Viscometer — T Bar Spindle (36mm) —20 RPM.

$$^{(2)}\% \text{ Overrun} = \frac{100 \times \text{Vol. of Whipped Topping (ml)}}{\text{Weight (g)}} - 100$$

EXAMPLE III

The emulsion concentrate of Example I was used as a coffee lightener. One teaspoonful of the concentrate was added to 200 ml of hot, brewed coffee. The concentrate lightened the color of the coffee and showed no feathering (flocculation). The lightened coffee had good flavor.

EXAMPLE IV

A stable emulsion concentrate similar in physical character to that described in Example I was prepared with a non-lauric fat. The emulsion concentrate was formulated as follows:

| INGREDIENT | WEIGHT PERCENT |
|---|---|
| Sucrose | 46.6 |
| Fat[1] | 25.0 |
| Water | 23.4 |
| Sodium stearoyl-2-lactylate[2] | 5.0 |

[1]DREWKREME D- hydrogenated soybean oil product containing a substantial quantity of remaining linoleic acid (6.5%) but is predominantly monounsaturated (64%); the remainder is saturated $C_{16}$ and $C_{18}$ acids - Drew Food Division, Drew Chemical Corp., Parsippany, New Jersey.
[2]EMPLEX-1160- Patco Products, Kansas City, Missouri. The emulsion concentrate was prepared as in Example I and exhibited similar storage stability to that of the emulsion concentrate prepared with the lauric fat, both at room temperature and at 40°F.

EXAMPLE V

The liquid emulsion concentrate of Example IV was employed to prepare a dessert topping. A 100g quantity of the emulsion concentrate at room temperature was added to 120 ml of cold milk (40°F.) and the mixture was whipped with a kitchentype machine beater for 3 minutes. The developed topping had a viscosity of 30 Brookfield Units and exhibited an overrun of 349%.

EXAMPLE VI

A stable, clear fluid emulsion concentrate was prepared as in Example I except the level of emulsifiers - sodium stearoyl-2-lactylate employed was 2.5% based on the weight of the concentrate, and the sugar concentration in the water phase was adjusted to 64.3%. The emulsion concentrate exhibited substantially the same stability as that of the Example I concentrate under similar condition of storage. The emulsion was still quite transparent after 2 months storage but at 4 months there was considerable fat separation.

EXAMPLE VII

The emulsion concentrate of Example VI was used after 24 hours storage at room temperature to prepare a dessert topping. A 100g quantity of emulsion concentrate at room temperature was added to 120 ml of milk at 43°F. and whipped for 3 minutes in a Sunbeam Mixmaster. A second dessert topping was prepared with the emulsion concentrate after the concentrate had been stored for 2 months at room temperature. A comparison of the physical properties of the dessert toppings follows:

| EMULSION CONCENTRATE | DESSERT TOPPING | |
|---|---|---|
| | Viscosity (Brookfield Units) | overrun (%) |
| Fresh Sample | 25 | 289 |
| Sample stored 2 months | 21 | 270 |

EXAMPLE VIII

A stable, clear fluid emulsion concentrate was prepared in which sodium stearyl fumarate was employed as the emulsifier. The emulsion concentrate was formulated as follows:

| INGREDIENT | WEIGHT PERCENT |
|---|---|
| Sucrose | 46.6 |
| Fat[1] | 25.0 |
| Water | 27.4 |
| Sodium stearyl fumarate[2] | 1.0 |

[1]WECOTOP A
[2]PRUV - Charles Pfizer and Co., Clifton, New Jersey.

A solution of 233g of sucrose in 137 ml of tap water was prepared. Then 5g of sodium stearyl fumarate was dispersed in 124g of the fat at 140°F. The oil phase was then added to the sucrose solution at 140°F. in a Waring Blendor and mixed at high speed for 10 minutes. On cooling, a slightly turbid emulsion was obtained. The emulsion concentrate was stable to phase separation and microbial activity for over one year when stored in a closed container at room temperature (70°F.).

EXAMPLE IX

The liquid emulsion concentrate of Example VIII was stored at room temperature for 24 hours and then employed to prepare a dessert topping.

A 100g quantity of the emulsion concentrate at 75°F. of Example VIII was added to 120 ml of cold homogenized milk (43°F.) and the mixture was whipped for 3 minutes in a kitchen type machine beater. The resulting dessert topping had a Brookfield Viscosity of 26 units and an overrun of 303%. The topping had good flavor and mouthfeel and was stable in a refrigerator (40°F.) for several days without noticeable loss of air.

EXAMPLE X

A stable, clear fluid emulsion concentrate, formulated to be a coffee lightener with sodium stearyl fumarate as the emulsifier and sucrose and dextrose as the sweetening agents was prepared. The coffee lightener was formulated as follows:

| INGREDIENT | WEIGHT PERCENT |
| --- | --- |
| Dextrose | 22.3 |
| Sucrose | 26.5 |
| Fat[1] | 26.3 |
| Water | 24.6 |
| Sodium Stearyl fumarate[2] | 0.3 |

[1]WECOTOP A
[2]PRUV

A mixture of 111.7g of dextrose and 132.8g of sucrose with 1.25g of sodium stearyl fumarate was prepared by mixing in a V-Blender for 10 minutes. This mixture was then dissolved in 123 ml of water by heating to 90°C. with mechanical stirring. The solution was then cooled to 60°C. In a Waring Blendor was added 131.5g of hydrogenated coconut oil (Wecotop A) which had previously been heated to 60°C. Mixing at high speed was continued for 10 minutes. On cooling, a low viscosity, slightly turbid emulsion was obtained.

EXAMPLE XI

The emulsion concentrate of Example X was used as a coffee lightener. One teaspoonful of the emulsion concentrate was added to 200 ml of hot (180°F.) brewed coffee. The concentrate had very high lightening power relative to half and half (light cream) and the sweetness from the sucrose-dextrose emulsion was scarcely detectable. A panel evaluation of the lightened coffee revealed the sodium stearyl fumarate emulsion had a cream-like flavor in the coffee. No oil slick was detectable when the emulsion concentrate was added to the hot coffee.

EXAMPLE XII

A stable, translucent fluid emulsion concentrate was prepared in which sodium stearyl fumarate and propylene glycol monostearate were employed as the emulsifiers and a mixture of sucrose and dextrose as the water soluble solids. The emulsion concentrate was formulated as follows:

| INGREDIENT | WEIGHT PERCENT |
| --- | --- |
| Fat (WECOTOP A) | 23.5 |
| Fat (Hydrogenated (95%) Cottonseed oil flakes) | 1.5 |
| Propylene glycol monostearate[1] (70% monostearate) | 4.5 |
| Sucrose | 39.1 |
| Dextrose | 6.9 |
| Sodium stearyl fumarate[2] | 1.0 |
| Water | 23.5 |

[1]Wilson-Martin Co., West New York, New Jersey
[2]PRUV

A 195.5g quantity of sucrose, 34.5g of dextrose, 22.5g of propylene glycol monostearate and 5g of sodium stearyl fumarate were preblended and then dissolved in 117.5g of water at 85°C. A 117.5g quantity of WECOTOP A and 7.5g of cottonseed oil flakes (58–60 Teter) were blended and melted. The melted fat was then added to the aqueous phase and the mixture blended at high speed in a Waring Blendor.

After cooling to room temperature, the emulsion concentrate had a viscosity of 3,950 centipoise (Brookfield Viscometer) and 32% light transmission as compared with distilled water (600 m$\mu$, 1 cm cell).

The emulsion concentrate was very stable and after 14 months storage at room temperature showed no phase separation or microbial spoilage. At the end of 14 months storage in a closed container at room temperatures, the viscosity remained virtually unchanged (4000 centipoise) and the light transmission increased to 54%.

EXAMPLE XIII

The liquid emulsion concentrate of Example XII was used after 24 hours storage at room temperature to prepare a dessert topping. A quantity of 100g of emulsion concentrate at room temperature (70°F.) was added to ½ cup (120 ml) of cold milk (40°F.) and the mixture whipped for 1½ minutes in a standard household electric mixer (Sunbeam Mixmaster). The dessert topping had a Brookfield Viscosity of 30 units and a 383% overrun.

A second portion of the liquid emulsion concentrate of Example XII, after 8 months storage in a closed container at room temperature, was used to prepare a dessert topping as described above. The prepared topping had a Brookfield Viscosity of 45 units and a 384% overrun.

EXAMPLE XIV

An emulsion concentrate was prepared in accordance with the formulation and method of Example XII with the exception that sodium stearyl fumarate was replaced with the sodium salt of succincylated monoglycerides as the primary emulsifier.

A sample of succinoylated monoglycerides, SMG Brand, Continuous Type Dough Conditioner, (Kraft Foods) was used to prepare the sodium salt. To 100g of this powder dispersed in 200 ml of water at 60°C. was added gradually with vigorous stirring 13.5g of $Na_2CO_3$-$H_2O$. After stirring for 10 minutes, the slurry was evaporated under vacuum in a stream of nitrogen. The last traces of moisture were removed in a vacuum oven at 60°C. and the resulting salt was ground to a fine powder prior to incorporation in the emulsion concentrate formulation.

EXAMPLE XV

The translucent liquid emulsion concentrate of Example XIV was used after 24 hours storage to prepare a dessert topping. A quantity of 100g of emulsion concentrate (75°F.) was added to 120 ml of cold milk (43°F.) and whipped in a Sunbeam Mixmaster for 3 minutes. The resulting topping had a viscosity of 45 Brookfield Units and an overrun of 297%.

EXAMPLE XVI

An emulsion concentrate was prepared employing the sodium salt of succinoylated monoglycerides as the primary emulsifier. The formulation of concentrate was similar to that of Example XIII, the major difference being the omission of the 95% hydrogenated cottonseed oil flakes.

| INGREDIENT | WEIGHT PERCENT |
|---|---|
| Fat (WECOTOP A) | 24.55 |
| Propylene glycol monostearate-(70% mono) | 4.78 |
| Sucrose | 38.70 |
| Dextrose | 7.29 |
| Sodium salt of succinoylated monoglycerides | 1.18 |
| Water | 23.50 |

The method of preparing the emulsifier and the emulsion concentrate was identical to that of Example XIII.

The emulsion concentrate was very stable. After over one year of storage in a closed container at room temperature there was no indication of phase separation or microbial spoilage and the emulsion concentrate, after this period of storage had a viscosity of 1,030 centipoise and a light transmission of 65% of that of water.

EXAMPLE XVII

The emulsion concentrate of Example XVI was used after 24 hours storage at room temperature to prepare a dessert topping. A 100g quantity of emulsion concentrate at room temperature was added to 120 ml of cold milk (43°F.) and whipped for 3 minutes in a Sunbeam Mixmaster. A second dessert topping was prepared with the emulsion concentrate after the concentrate had been stored for 8 months at room temperature. A comparison of the physical properties of the dessert toppings follows:

| EMULSION CONCENTRATE | DESSERT TOPPING | |
|---|---|---|
| | Viscosity (Brookfield Units) | Overrun (%) |
| Fresh Sample | 30 | 383 |
| Sample stored 8 months | 45 | 384 |

EXAMPLE XVIII

An emulsion concentrate was prepared employing sodium malated propylene glycol monostearate as the emulsifier. The emulsion concentrate was formulated as follows:

| INGREDIENT | WEIGHT PERCENT |
|---|---|
| Fat[1] | 24.1 |
| Propylene glycol monostearate (50% mono) | 4.6 |
| Sucrose | 40.1 |
| Dextrose | 7.1 |
| Water | 23.1 |
| Sodium malated propylene glycol monostearate | 1.0 |

[1]WECOTOP A

The sodium malated propylene glycol monostearate was prepared by first heating and stirring at 140°C. a mixture of 35.6g of malic acid, 100g of dimethyl formamide, and 100g of propylene glycol monostearate (Wilson-Martin Co., West New York, New Jersey — 70% mono-ester). Initially a clear solution formed which after two hours began to deposit insoluble material. The solution was decanted from the solids and diluted with a large volume of water. After filtering the crystals, they were washed several times and then dried at room temperature.

The crystals had an acid value of 31.5 (milligrams of KOH to neutralize 1g of crystals). A quantity of 100g of dried crystals was suspended in water and neutralized with 3.6g of $Na_2CO_3H_2O$.

The emulsion concentrate was prepared by the method described in Example XII.

EXAMPLE XIX

A dessert topping was prepared employing the emulsion concentrate of Example XV and the method described in Example XIV. The resulting topping had a viscosity of 25 Brookfield Units and an overrun of 301%.

EXAMPLE XX

A stable liquid emulsion was prepared in which propylene glycol monostearate (70% mono) and the sodium salt of diacetyl tartaric acid esters of mono- and di-glycerides were employed as the emulsifiers. The emulsion concentrate had the following formula:

| INGREDIENT | WEIGHT PERCENT |
|---|---|
| Fat[1] | 20 |
| Water | 25 |
| Sucrose | 49.76 |
| Sodium salt of diacetyl tartaric acid esters of mono- and di-glycerides[2] | 0.24 |
| Propylene glycol monostearate | 5. |

[1]KAOMEL- a blend of hydrogenated and fractionated soybean and cottonseed oils - Durkee Famous Foods -Cleveland, Ohio
[2]EMCOL-D66-1-Witco Chemical Organics Division, New York. N.Y.

The emulsion concentrate was prepared according to the method of Example XII and, after 24 hours storage at room temperature was used to prepare a dessert topping as in Example XIV. The resulting topping had good flavor and texture. The viscosity of the topping, as measured at room temperature with a Brookfield Viscometer using a T Bar at 20 RPM, was 40 Brookfield Units and the topping exhibited an overrun of 232%.

EXAMPLE XXI

A butter flavored syrup was prepared employing sodium stearyl fumarate as the emulsifier. The emulsion had the following formula:

| INGREDIENT | WEIGHT PERCENT |
|---|---|
| Butter oil | 2.3 |
| Sucrose | 4.6 |
| Corn syrup[1] | 74.32 |
| Water | 18.62 |

| INGREDIENT | WEIGHT PERCENT |
|---|---|
| Sodium stearyl fumarate[2] | 0.02 |
| Mono- and di-glycerides[3] | 0.14 |

[1]MOR SWEET No. 1637 - Corn Products Refining Co., Argo, Illinois
[2]PRUV
[3]ATMUL 80 - a blend of mono- and di-glycerides made from hydrogenated vegetable fats, melting point 122–125°F., 40–44% mono content - Atlas Chemicals Div., Wilmington, Delaware.

The butter flavored syrup was prepared by a procedure as in Example XII. The syrup was turbid initially but, upon storage it did not show any sugar crystallization and did not change perspectively from its excellent initial flavor and mouthfeel.

EXAMPLE XXII

MAPLE FLAVORED SPREAD

A maple flavored spread was prepared by substituting melted margarine for the fat in the formula of Example I and adding a small amount of maple flavoring. The maple flavored spread had the following formulation:

| INGREDIENT | WEIGHT |
|---|---|
| Sucrose | 233 |
| Water | 117 |
| Margarine[1] | 125 |
| Sodium stearoyl-2-lactylate[2] | 25 |
| Flavor[3] | (5 drops) |

[1]IMPERIAL BRAND MARGARINE -Lever Brothers, New York, N.Y.
[2]EMPLEX 1160
[3]IFF FLAVOR V-2000 - International Flavor & Fragances, N.Y., N.Y.

On cooling, the above emulsion became a spreadable paste which could be used on pancakes and waffles. Another maple flavored spread was prepared in which a soft margarine was substituted for the Imperial Margarine with equally acceptable results.

Both emulsion concentrates were stored at room temperature for several months before fat separation was observed.

EXAMPLE XXIII

THICK SHAKE PRODUCTS

Those clear emulsions containing sucrose and hydrogenated coconut oils (Example I), when mixed with chocolate syrup or cocoa and milk and shaken vigorously for about one minute, yielded thick, creamy chocolate drinks. The chocolate flavor level and the thickness could be varied over a wide range by changing the proportions of milk to chocolate to emulsion. When refrigerated, the thick shake product provided a cold, creamy drink and, when frozen, the thick shake product dispersed readily in cold milk to give a chocolate drink or could be eaten directly from the freezer as a semi-soft ice cream substitute.

In view of the above, it will be seen that the several objects of the invention are achieved and other advantages results obtained. By the foregoing, the present invention has been described in such detail as to enable others skilled-in-the-art to make and use the same, and, by applying current knowledge, adapt the same for use under varying conditions of service, without departing from the essential features of novelty thereof, which are intended to be defined and secured by the appended claims.

What is claimed and desired to be secured by Letters Patent is:

1. As a food product, a shelf-stable, protein-free emulsion having a pH within the range of from about 6 to about 8, and consisting of in combination, on a weight basis:
   a. from about 0.1 part to 1 part of neutral type fat, substantially free of both fatty and of mineral acidity;
   b. about 1 part water;
   c. about 2 parts sugar; and
   d. from about 0.25% to about 7% by weight of the total emulsion of an emulsifier selected from the group consisting of sodium stearyl fumarate and sodium succinoylated monoglycerides.

2. The emulsion according to claim 1 wherein the sugar comprises sucrose.

3. The emulsion according to claim 1 wherein the sugar comprises a mixture of sucrose and dextrose.

4. The emulsion according to claim 1 wherein the fat is derived from the group consisting of coconut, cottonseed safflower, soybean, palm kernel and animal sources.

5. The emulsion according to claim 1 wherein the emulsifier comprises sodium stearyl fumarate.

6. The emulsion according to claim 1 wherein the emulsifier comprises sodium succinoylated monoglycerides.

7. As a food product, a shelf-stable, protein-free emulsion having a pH within the range of from about 6 to about 8, and consisting of in combination, on a weight basis:
   a. from about 0.1 part to 1 part of neutral type fat, substantially free of both fatty and mineral acidity;
   b. about 1 part water;
   c. about 2 parts sugar;
   d. from about 0.25% to about 7% by weight of the total emulsion of an emulsifier selected from the group consisting of sodium stearyl fumarate and sodium succinoylated monoglycerides; and
   e. 0.75% to 5% by weight of the total emulsion, of an adjunct emulsifier.

8. The emulsion according to claim 7 wherein the adjunct emulsifier comprises propylene glycol monostearate.

9. As a food product, a shelf-stable, protein-free emulsion having a pH within the range of from about 6 to about 8, and consisting of in combination, on a weight basis:
   a. from about 0.1 part to 1 part of neutral type fat, substantially free of both fatty and mineral acidity;
   b. about 1 part water;
   c. about 2 parts sugar;
   d. from about 0.25% to about 7% by weight of the total emulsion of an emulsifier selected from the group consisting of sodium stearyl fumarate and sodium succinoylated monoglycerides; and
   e. food additives selected from the group consisting of flavoring, coloring and combinations of these.

10. As a food product a shelf-stable, protein-free emulsion having a pH within the range of from about 6 to about 8, and consisting of in combination, on a weight basis:
   a. from about 0.1 part to 1 part of neutral type fat, substantially free of both fatty and mineral acidity;
   b. about 1 part water;
   c. about 2 parts sugar;

d. from about 0.25% to about 7% by weight of the total emulsion of an emulsifier selected from the group consisting of sodium stearyl fumarate and sodium succinoylated monoglycerides;

e. 0.75% to 5%, by weight of the total emulsion, of an adjunct emulsifier; and f. food additives selected from the group consisting of flavoring, coloring and combinations of these.

11. The emulsion according to claim 10 wherein the adjunct emulsifier comprises propylene glycol monostearate.

* * * * *

UNITED STATES PATENT AND TRADEMARK OFFICE
CERTIFICATE OF CORRECTION

PATENT NO. : 3,958,033
DATED : May 18, 1976
INVENTOR(S) : Rex J. Sims and Howard D. Stahl It is certified that error appears in the above—identified patent and that said Letters Patent are hereby corrected as shown below:

Column 4, line 1, "solution of" should read -- solution to --.

Column 8, line 61, "124g" should read -- 125g --.

Signed and Sealed this

Third Day of May 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,958,033
DATED : May 18, 1976
INVENTOR(S) : Rex J. Sims, Howard D. Stahl It is certified that error appears in the above-identified patent and that said Letters Patent are hereby corrected as shown below:

Title page, line 63, "Continuation of Ser. No. 434,531,

Jan. 18, 1974, abandoned." should read

--Continuation of Ser. No. 434,531, Jan. 18, 1974, abandoned, which in turn is a continuation of Ser. No. 225,688, Feb. 9, 1972, also abandoned--.

Column 1, lines 4-5, "This is a continuation of application

Ser. No. 434,531, filed Jan. 18, 1974, now abandoned".

should read

--This is a continuation of application Ser. No. 434,531, filed Jan. 18, 1974, now abandoned, which in turn is a continuation of Ser. No. 225,688, filed Feb. 9, 1972, also abandoned.--

Signed and Sealed this

Sixth Day of December 1977

[SEAL]

Attest:

RUTH C. MASON
Attesting Officer

LUTRELLE F. PARKER
Acting Commissioner of Patents and Trademarks